United States Patent [19]

Ota et al.

[11] Patent Number: 5,025,456
[45] Date of Patent: Jun. 18, 1991

[54] BURST MODE DIGITAL DATA RECEIVER

[75] Inventors: Yusuke Ota, Mountain Lakes; Robert G. Swartz, Tinton Falls, both of N.J.

[73] Assignee: AT&T Bell Laboratories, Murray Hill, N.J.

[21] Appl. No.: 305,035

[22] Filed: Feb. 2, 1989

[51] Int. Cl.$^5$ ............................................. H04L 25/06
[52] U.S. Cl. ........................................ 375/76; 375/98; 307/358
[58] Field of Search .................... 375/76, 98; 307/268, 307/357, 358, 359; 455/608, 239, 240; 328/149; 330/11

[56] References Cited

U.S. PATENT DOCUMENTS

| | | | |
|---|---|---|---|
| 3,947,769 | 3/1976 | Rousos et al. | 375/76 |
| 4,236,256 | 11/1980 | Brackett et al. | 455/608 |
| 4,471,451 | 9/1984 | Schenek | 364/605 |
| 4,481,676 | 11/1984 | Eumurian et al. | 455/608 |
| 4,540,897 | 9/1985 | Takaoka et al. | 307/268 |
| 4,545,076 | 10/1985 | Biard et al. | 455/608 |
| 4,577,683 | 3/1986 | Roberts et al. | 329/50 |
| 4,688,097 | 8/1987 | Lin | 358/171 |
| 4,736,391 | 4/1988 | Siegel | 375/76 |
| 4,852,126 | 7/1989 | Tanaka et al. | 375/76 |

Primary Examiner—Stephen Chin
Attorney, Agent, or Firm—John A. Caccuro

[57] ABSTRACT

A burst mode digital data receiver automatically adjusts its logic reference voltage to be equal to one-half of the sum of the minimum and maximum excursions of a received data signal. The receiver includes a differential amplifier circuit which has a first input for receiving the data signal and a second input connected to a voltage reference circuit. The voltage reference circuit is responsive to an output signal from the amplifier circuit to produce the required logic reference voltage at the second input to the amplifier circuit by generating a feedback signal which causes the amplifier circuit to have a first gain value during the absence of the data signal and while the data signal is less than its peak amplitude and a second gain value approximately twice the first gain value for a predetermined time after the peak amplitude of the data signal is reached.

14 Claims, 5 Drawing Sheets

BURST MODE DIGITAL DATA RECEIVER

TECHNICAL FIELD

This invention relates to digital data receivers and more particularly to a receiver for receiving burst mode digital data.

BACKGROUND OF THE INVENTION

Inter-computer and intra-computer communications are often characterized by burst mode data transmissions. Conventional ac-coupled optical receivers, intended for continuous data transmission, are usually employed. Undesirably, however, data encoding increases system complexity and reduces the effective data transmission speed. By contrast, high-speed, dc-coupled receivers, while ideally suited for burst mode operation, have proven difficult to implement because of the necessity of establishing a logic reference voltage $V_{REF}$ level within a few millivolts of the dc center (one-half of the sum of the minimum and maximum excursions of the data signal) of the received data pulse.

When a digital data signal from a data link is received by a preamplifier of a dc-coupled receiver the signal has been degraded to an analog-type signal with uncertain amplitude and non-zero transition times between the logic ZERO and logic ONE levels. Ideally, the dc center of the preamp output should match the logic threshold of the decision circuit so that the decision circuit can restore the analog-type signal to a clean digital signal. When the dc center at the preamp output does not match the logic threshold, the decision circuit causes pulse-width distortion (PWD) or may not be able to detect a logic transition. This PWD is undesirable because it reduces the sensitivity and maximum bandwidth of the system. The problem is additionally complicated by the fact that input data amplitudes can vary by factors of 100 or more.

Thus it is a continuing problem to design a burst mode digital data receiver with minimized PWD and increased sensitivity.

SUMMARY OF THE INVENTION

In accordance with the present invention, a burst mode digital data receiver adapts to the amplitude of the incoming burst data packet and automatically adjusts the logic threshold voltage to the dc center of the input data pulse. The present receiver includes a balanced differential input transimpedance circuit having a first input for receiving an input burst data signal and a second input connected to a voltage reference circuit that sets the logic threshold voltage. The voltage reference circuit is connected in a feedback loop between both the output of and the second input of the transimpedance circuit for generating a feedback signal to the transimpedance circuit, resulting in the receiver having (a) a first gain value both during the absence of the input data signal and while the input data signal is less than its peak amplitude, and (b) a second gain value approximately equal to two times the first gain value for a predetermined time after the peak amplitude of the input data signal is reached.

In a disclosed embodiment, the voltage reference circuit and the transimpedance circuit have substantially the same maximum data transmission rate and the feedback loop is stable at the maximum data rate of the transimpedance circuit. As a result, the logic threshold voltage is adjusted to be substantially equal to the dc center of the input data pulse within one bit time following the beginning of the incoming burst data packet.

DETAILED DESCRIPTION

Figure 1:
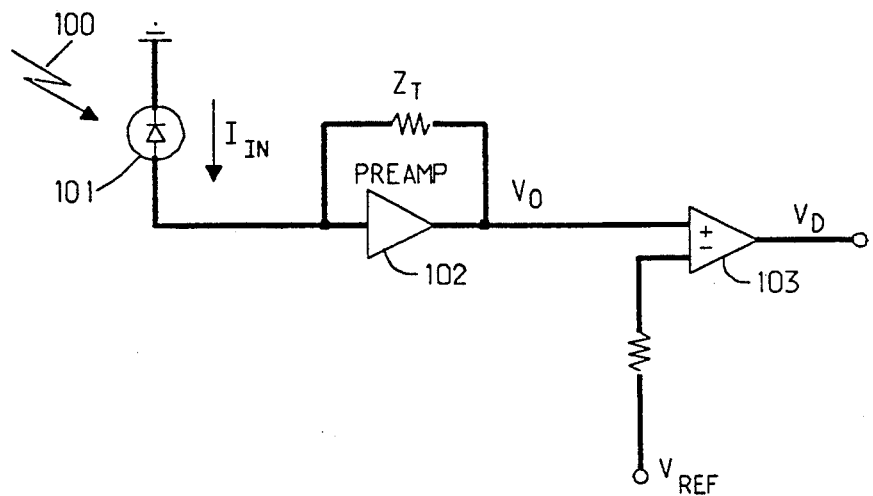
FIG. 1 shows one prior art dc-coupled burst mode receiver.

FIG. 1 is illustrative of a prior art dc-coupled burst-mode-operated optical receiver. In FIG. 1, a photodetector 101 delivers an optical input current $I_{IN}$ proportional to the optical power input received by photodetector 101 from lightwave signal 100. This current is converted to a voltage by the transimpedance preamplifier (preamp) 102 and delivered to an input of a "decision" circuit 103. The decision circuit 103 may be a high gain amplifier or a clocked regenerative latch, and its purpose is to restore a received analog signal with uncertain amplitude to a clean digital ZERO or ONE. When implemented as a clocked latch, it also serves to re-time the logic transitions at its output so as to remove phase noise arising from such factors as dispersion pulse-width distortion, and timing jitter. The other input of decision circuit 103 is connected to a reference voltage $V_{REF}$ that sets the logic threshold.

The problem to which the present invention is directed is better understood with reference to FIGS. 2-5. These figures show, for the receiver of FIG. 1, the resulting PWD when the $V_{REF}$ does not track the dc center voltage of different received signal levels (e.g., V1, V2 and V3).

Figure 2:
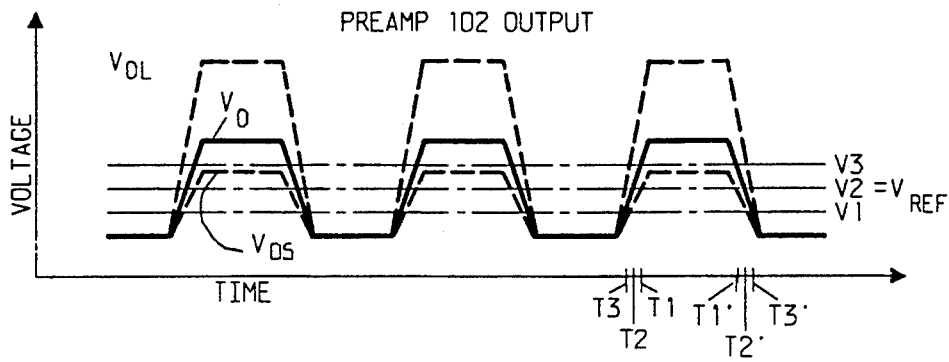
FIGS. 2-5 show, for the receiver of FIG. 1, the resulting PWD when the logic reference voltage $V_{REF}$ does not track the dc-center voltage of different received signal levels.
Figure 3:
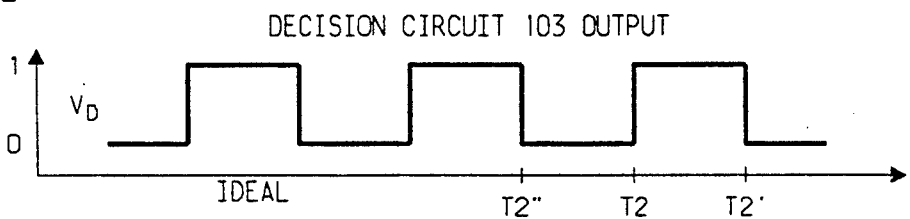

The preamp 102 output $V_0$ should, in an ideal case, swing symmetrically above and below $V_{REF}$, depending, respectively, on the presence or absence of an optical input current (photocurrent) $I_{IN}$. This occurs when the dc center voltage equals $V_{REF}$, where the dc center voltage is defined herein as one-half the sum of the minimum and maximum excursions of output signal $V_0$. This condition is illustrated in FIG. 2 which illustrates the voltage $V_0$ for a repeating 010101, etc., data sequence. Specifically, note that, when the dc center voltage V2 equals $V_{REF}$ then output signal $V_0$ swings symmetrically around V2. Hence, the output $V_D$ of decision circuit 103, shown in FIG. 3, is of uniform width during the logic ZERO and ONE bits. Since the width of the logic ZERO (T2"-T2) and logic ONE (T2-T2') bits are equal, no pulse-width distortion (PWD) results.

When the optical input current $I_{IN}$ is very small, however, the corresponding voltage swing of preamp output signal-denoted $V_{OS}$ in FIG. 2-will be small and the resulting dc center voltage at the preamp output (V1 of FIG. 2) will also be small. Under such a condition, $V_{REF}$ would be larger than dc center voltage V1.

Figure 4:
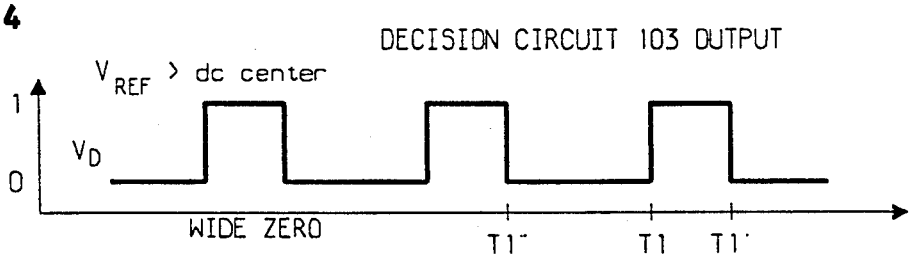
Figure 5:
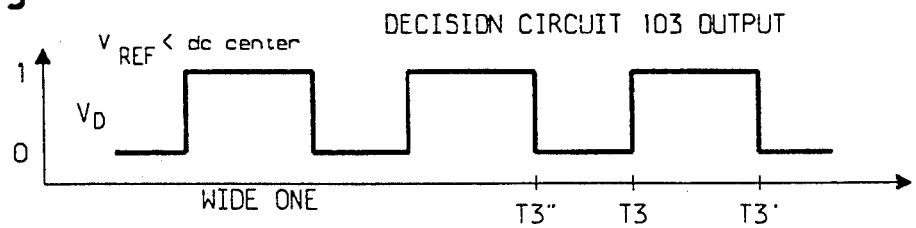

The result is that decision circuit output $V_0$ has a widened logic ZERO level (T1''-T1) and a narrowed logic ONE level (T1-T1'), as shown in FIG. 4. This asymmetric output that $V_D$ exhibits is, in fact, PWD, which results because $V_{REF}$ is not centered in the pulse (i.e., $V_{REF}$ does not equal dc center voltage V1). FIG. 5 shows the effects when $V_{REF}$ is less than the dc center voltage (e.g., V3), which results when the input current $I_{IN}$ is very large and hence output $V_0$ is large (see $V_{OL}$ of FIG. 2). The decision circuit 103 output $V_D$ exhibits a narrow logic ZERO (T3''-T3) and wide logic ONE (T3-T3'). The PWD of FIGS. 4 and 5 is undesirable because it reduces the maximum data transmission rate and sensitivity of the receiver of FIG. 1. To minimize PWD as the amplitude of the input current $I_{IN}$ changes, the voltage $V_{REF}$ must also change by a corresponding amount.

Figure 6:
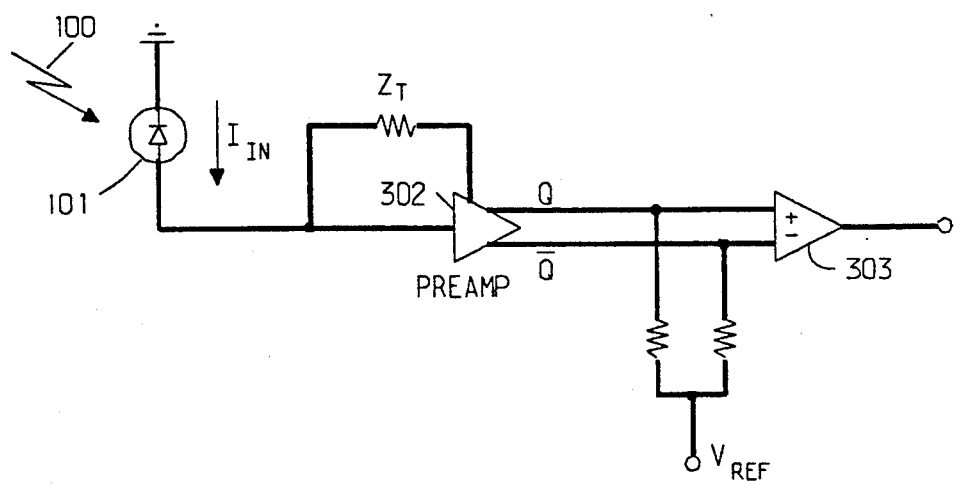
FIG. 6 shows another prior art dc-coupled burst mode receiver.

FIG. 6 illustrates a prior art receiver designed to reduce the severity of the PWD. In FIG. 6, use is made of the differential inputs to the decision circuit 303 by converting the preamp 302 to a differential output configuration. In this circuit, because the preamp output voltages are Q and $\overline{Q}$, the difference voltage $Q-\overline{Q}$ determines the decision circuit 303 logic state, and the precise value of $V_{REF}$ is unimportant. Thus, having $V_{REF}$ at a level which is not equal to the dc center voltage has no effect on PWD. This approach introduces a new problem, however, in that when the optical input current $I_{IN}$ is absent (e.g. a logic ZERO input), identical dc voltages at the Q and $\overline{Q}$ outputs leave the decision circuit in an undefined logic state. Accordingly, a large enough "logic ZERO offset" must be established at the inputs to ensure that the decision circuit 303 is in a well-defined logic ZERO state when the optical input is absent. The required magnitude of LZO is chosen based on the input sensitivity of the decision circuit 303 at the maximum bit rate, and on the maximum tolerable PWD.

Figure 7:
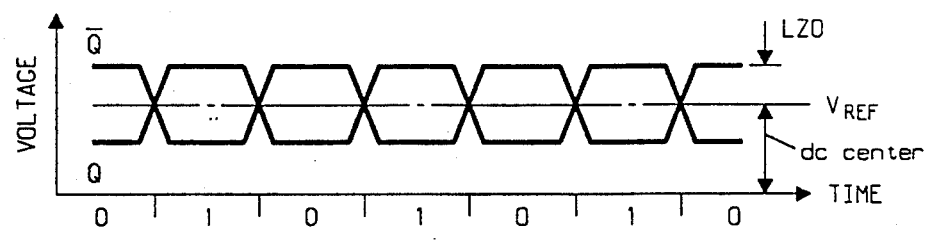
FIGS. 7-10 show, for the receiver of FIG. 6, the PWD at different received signal levels.
Figure 8:
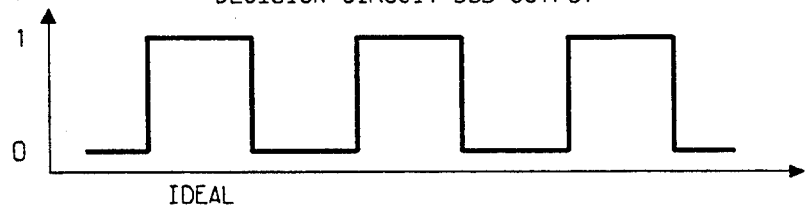
Figure 9:
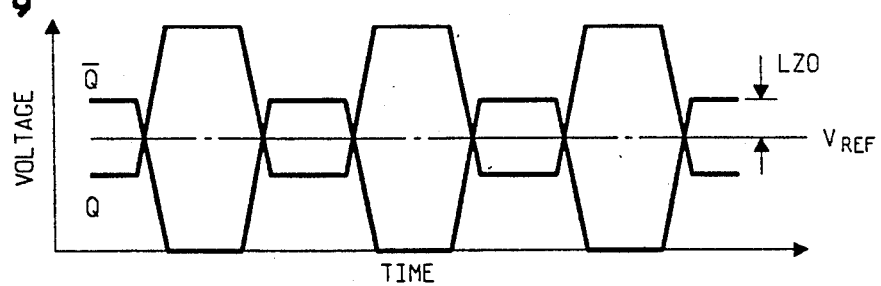
Figure 10:
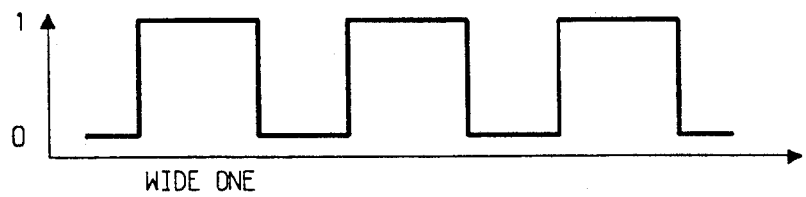

Shown in FIG. 7 are the Q and $\overline{Q}$ complementary outputs of preamp 302 as a function of time in response to a 0101010, etc. input data sequence with realistic rise and fall times. In the ideal case, with the LZO chosen to be exactly one-half of the preamp 302 output swing, the widths of the logic ZERO and logic ONE pulses output by decision circuit 303 are equal, as shown in FIG. 8, and there is no PWD. FIG. 9, however, shows that when the input current $I_{IN}$ is doubled, the preamp 302 output swing is doubled in amplitude while LZO is fixed at the previous level. Consequently, the logic ONE pulse width is much larger than that of the logic ZERO, as shown in FIG. 4, and the PWD is large. In fact, for any preamp 302 output amplitude swing other than 2×LZO, PWD will be present.

Moreover, as the amplitude of the input current $I_{IN}$ increases, the PWD will increase until at some input level, determined by rise and fall times, the logic ZERO pulse will vanish altogether. This is because a long sequence of ONEs may cause the differential output to ramp to a larger voltage than the voltage for a single logic ONE, leaving insufficient time for a single ZERO pulse to effect a logic state reversal. An alternative statement for minimum PWD is (from FIG. 7) that $$(Q-\overline{Q})_{ZERO} = -(Q-\overline{Q})_{ONE}.$$

Thus, the prior art dc-coupled receiver circuits of FIGS. 1 and 6 have not been able to detect input data signals having large dynamic ranges without exhibiting undesirable amounts of PWD.

In accordance with the present invention, an adaptive voltage reference circuit measures the amplitude of an incoming burst data packet and, within (in the present embodiment) a few nanoseconds of its arrival, automatically adjusts the logic threshold voltage to the dc center voltage of the input signal. Consequently, PWD is minimized, and overall system sensitivity is maximized.

Figure 11:
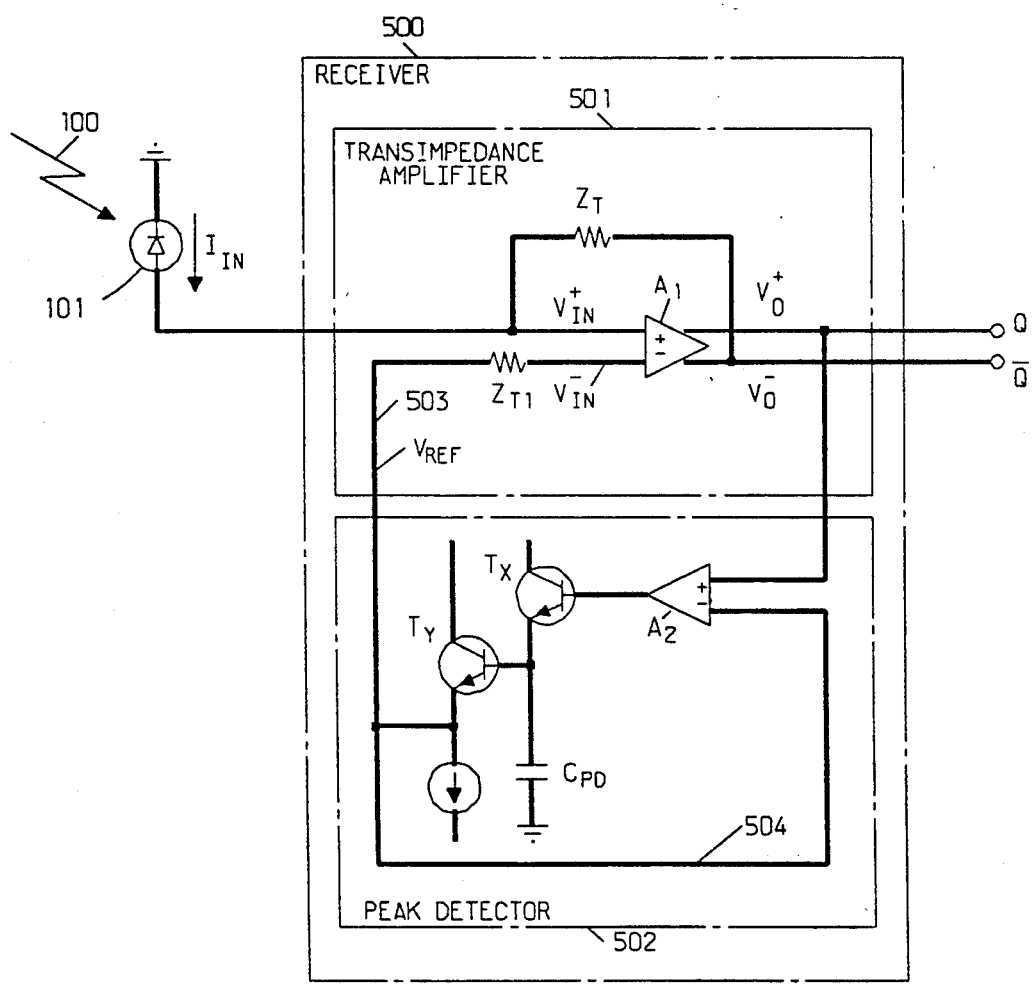
FIG. 11 shows a burst mode receiver in accordance with the present invention.

The present invention is illustrated in FIG. 11 where the receiver circuit 500 includes two circuit units 501 and 502. The first unit 501 is, illustratively, a well-known differential input/output transimpedance amplifier with a nominal transimpedance value of $Z_T$, as determined by the feedback resistor $Z_T$. The second unit 502 is a voltage reference circuit, illustratively implemented as a peak detector, for generating a reference voltage $V_{REF}$ that sets the logic threshold voltage for the first unit 501. In the remainder of the text, the terms voltage reference circuit 502 and peak detector 502 are used interchangeably. The peak detector 502 comprises a differential amplifier $A_2$, blocking transistor $T_X$, peak voltage holding capacitor $C_{PD}$, and buffer transistor $T_Y$.

The peak detector 502 has the positive input of differential amplifier $A_2$ connected to the positive output lead ($V_0^+$) of transimpedance amplifier $A_1$ and its output 503 connected to the resistor $Z_{T1}$ ($Z_{T1} = Z_T$) connected to the negative input of transimpedance amplifier $A_1$. This connection forms a negative feedback loop for generating the reference dc-voltage on lead 503 from the voltage on lead $V_0^+$ of amplifier $A_1$. Another feedback loop 504, comprising amplifier $A_2$ and transistors $T_X$ and $T_Y$, controls the voltage gain of peak detector 502.

The operation of the present invention is best understood by analyzing the differential transfer function of transimpedance amplifier $A_1$ as a result of the connection of peak detector 502.

For transimpedance amplifier $A_1$, the low-frequency, differential transfer function is $\Delta V_0 = V_0^+ - V_0^- = +Z_T I_{IN}$, where $I_{IN}$ is the input current.

The peak detector 502 samples only one of amplifier $A_1$ outputs, and therefore stores the peak value of the single-ended transfer function, $$\Delta V_0^+ = Z_T \frac{I_{IN}}{2}.$$

Thus, a $V_{REF}$ with amplitude exactly equal to one-half the peak differential signal swing is generated by peak detector 502 and applied to the negative input of the transimpedance amplifier $A_1$. Preferred embodiments of the present invention advantageously utilize the inherent signal-splitting characteristic of a differential amplifier (i.e., $A_1$) to develop a $V_{REF}$ that scales ideally with input signal amplitude.

Consider the following sequence of events in order to better understand the operation of the circuit. Suppose that at time $t=0$, there is no data present and, therefore, $I_{IN}=0$. The peak detector capacitor $C_{PD}$ is discharged. When the data burst arrives, and under the condition that $\Delta V_0^+ = -\Delta V_0^-$, the transfer equation for the circuit in FIG. 11 is $$\Delta V_0^+ = \frac{I_{IN}Z_T}{2}.$$

(Here "$\Delta$" signifies the change in voltage level after arrival of the data burst.) The peak detector amplifier $A_2$ charges capacitor $C_{PD}$ until the voltage at amplifier $A_2$'s plus and minus nodes are equalized. Turn-on voltage offsets ($V_{BE}$) in $T_X$ and $T_Y$ are reduced in amplitude by a factor proportional to the open loop gain of amplifier $A_2$. The voltage stored on capacitor $C_{PD}$, proportional to $$\frac{I_{IN}Z_T}{2},$$

is equal to the desired $V_{REF}$.

Alternatively, one may understand the present invention conceptually by recognizing that the decision circuit function (i.e., the function performed by circuit 103 of FIG. 1) has effectively been incorporated into the differential input transimpedance amplifier 501; and the reference threshold voltage (i.e., $V_{REF}$ of FIG. 1) establishes a reference dc current through resistor $Z_{T1}$ equal to the midpoint of the input current $I_{IN}$. Thus, peak detector 502 dynamically generates a dc reference voltage $V_{REF}$ on lead 503 which is equal to the required dc center voltage. This ensures that the input current $I_{IN}$ will vary symmetrically around the reference current $V_{REF}/Z_{T1}$ and consequently minimize PWD in a manner similar to that discussed in FIGS. 2–5 when $V_2 = V_{REF}$. Thus, when input current $I_{IN}$ increases, $V_{REF}$ increases; and when $I_{IN}$ decreases, $V_{REF}$ decreases. This enables receiver 500 to have improved sensitivity (for low $I_{IN}$) and large dynamic input range (ratio of high $I_{IN}$ to low $I_{IN}$).

When the data burst has passed, the voltage stored on the peak detector capacitor $C_{PD}$ decays with a discharge rate determined by the amplitude of the base current of buffer transistor $T_Y$. This suggests that the frequency response characteristics of receiver 500 may be sub-divided into three domains of interest. In the first, low-frequency domain, the peak detector capacitor $C_{PD}$ is approximated by an open circuit, so that the peak detector 502 becomes simply a unity gain amplifier, and the overall small signal gain function is $\Delta V_0 = I_{IN}Z_T$. In the second, high-frequency domain, the peak detector capacitor $C_{PD}$ is charged to a fixed value proportional to the half-amplitude of the input current $I_{IN}$, and the small signal gain function becomes $\Delta V_0 = +2 I_{IN}Z_T$. In the third, very high-frequency domain, gain function rolls off with a dominant pole determined by the product of $Z_T$ and the capacitance at amplifier $A_1$'s positive input, divided (approximately) by the gain of amplifier $A_1$. A detailed analysis of the transimpedance of amplifier $A_1$ in the low- and high-frequency domains of interest is provided in a later section.

Two additional requirements imposed on the receiver 500 may be noted. First, the peak detector capacitor $C_{PD}$ must charge very rapidly—ideally, in a time comparable to the width of a single ONE pulse—so that the "cold" system can go to a "warm" state in time for the second bit of data in the burst. At a data transmission rate of 200 Mb/s, this allows 5 ns for acquisition of the pulse amplitude information. Second, because output $\Delta V_0$ is as small as a few millivolts, all circuit offsets must be self-cancelling to first order. To satisfy these requirements, amplifiers $A_1$ and $A_2$ are, in preferred embodiments, designed to have substantially identical operating characteristics (i.e., $A_1$ and $A_2$ are "twins" of each other). For any given data rate, amplifier $A_1$ must (by definition) be designed with enough bandwidth to accommodate that data rate. Therefore, by selecting amplifier $A_2$ as the twin of amplifier $A_1$, we guarantee that amplifier $A_2$ is inherently endowed with sufficient bandwidth to perform the amplitude sampling function in a single bit period (providing $C_{PD}$ is not too large). Furthermore, because amplifier $A_2$ (here defined to include $T_X$ and $T_Y$) is the twin of amplifier $A_1$, most structural offsets (e.g., transistor $V_{BE}$ drops) within $A_2$ are balanced to first order by the same offsets within amplifier $A_1$. Small residual offsets are further reduced by the feedback around amplifier $A_2$. Thus, assuming that component mismatches can be controlled in the IC fabrication technology, high-speed, high-accuracy pulse amplitude acquisition is assured.

The following paragraphs describe the operation modes of receiver 500 of FIG. 11 in the low- and high-frequency domains of interest:

(1) Low frequency, or at the very beginning of a data burst: the peak detector amplifier $A_2$ acts simply as a unity gain feedback amplifier.

(2) High frequency: peak detector amplifier $A_2$ has sampled the data amplitude and provides only a "reference" voltage to the negative input terminal of transimpedance amplifier $A_1$.

MODE 1 OPERATION

During Mode 1 operation (low frequency or during peak detection), peak detector amplifier $A_2$ acts like a unity gain amplifier. This is because we here define "low" to mean frequencies where the discharging and charging of capacitor $C_{PD}$ allow the peak detector circuit 502 to track the amplifier 501 Q output. The following equations define the operation of the circuit during Mode 1:

$$V_{IN}^+ = V_0^- + I_{IN}Z_T \tag{1}$$

$$V_{IN}^- = V_0^+ \tag{2}$$

and $$V_0^+ - V_0^- \quad \Delta V_0 = G(V_{IN}^+ - V_{IN}^-) + V_{offset} \tag{3}$$

where $V_{offset}$ is the inherent amplifier offset voltage and $G$ is the voltage gain of transimpedance amplifier $A_1$ ($G \gg 0$).

(A) Suppose that there is no input photocurrent present, i.e., $I_{IN} = 0$. Then substituting equation (1) and (2) into (3) yields $$\Delta V_0 = G(V_0^- - V_0^+) + V_{offset}$$

$$\Delta V_0 = \frac{V_{offset}}{1 + G} \tag{4}$$

Therefore, receiver 500 has improved sensitivity or accuracy because it reduces the inherent voltage offset by the open-loop gain $G$ of amplifier $A_1$. Henceforth, in the following analysis we therefore ignore $V_{offset}$.

(B) At the beginning of the data burst, current $I_{IN}$ is not zero. Then substituting equation (1) and (2) into (3) yields $$\Delta V_0 = G(-\Delta V_0 + I_{IN}Z_T)$$

-continued solving:

$$\Delta V_0 = \frac{G}{1+G} I_{IN} Z_T \approx I_{IN} Z_T \quad (5)$$

The difference in the output voltage when a data pulse is present ($I_{IN} \neq 0$), i.e., a logic ONE signal, and when a data pulse is not present ($I_{IN}=0$), i.e., a logic ZERO signal, is equation (5) minus equation (4) or $$\Delta(\Delta V_0) = \frac{G}{1+G} I_{IN} Z_T \quad (6)$$

Thus, the low frequency differential transimpedance is $$\frac{G Z_T}{1+G} \approx Z_T \quad (7)$$

MODE 2 OPERATION

During Mode 2 (high frequency: peak detector has charged to a fixed "reference" level), then $V_{IN}^- = -V_{REF}$ output by peak detector amplifier $A_2$. $V_{REF}$ is calculated as follows:

As calculated previously from equation (4), with no data pulse ($I_{IN}=0$) present, $$\Delta V_0 = \frac{V_{offset}}{1+G}.$$

As previously noted, for simplicity of analysis $V_{offset}$ is small and its effects ignored. Thus, equation (4) becomes $\Delta V_0 \approx 0$, i.e., $$V_0^+ = V_0^- \quad V_0 \text{ (dc)} \quad \text{dc output voltage with no data present} \quad (8)$$

Correspondingly, $$V_0^+ + V_0^- = 2 V_0(dc) \quad (9)$$

Equation (9) is always true, whether photocurrent $I_{IN}$ is present or not, because of conservation of current in the output stage of differential amplifier $A_1$.

Now, by definition, $V_{REF}$ is the peak value of $V_0^+$ when current pulse is present, i.e.

$$V_{REF} = V_0^+ \text{ (peak)} \quad (10)$$

Adding equation (5)

$$V_0^+ - V_0^- = \frac{G}{1+G} \cdot I_{IN} Z_T$$

to equation (9)

$$V_0^+ + V_0^- = 2 V_0(dc)$$

we solve for $$V_0^+ \text{ (peak)} = V_{REF} = V_0(dc) + \frac{G}{2(1+G)} \cdot I_{IN} Z_T \quad (11)$$

With $V_{REF}$ calculated, we can now proceed to a calculation of $\Delta V_0$ with and without data present ($I_{IN} \neq 0$ and $I_{IN}=0$, respectively).

(C) With current pulse $I_{IN}$ present and again ignoring $V_{offset}$, then using equations (3), (11) and $$V_{IN}^+ = V_0^- + I_{IN} Z_T$$

we obtain $$\Delta V_0 = V_0^+ - V_0^- = G(V_{IN}^+ - V_{IN}^-) \quad (12)$$
$$= G(V_0^- + I_{IN} Z_T - V_{REF})$$
$$= G\left(V_0^- + I_{IN} Z_T - V_0(dc) - \frac{G}{2(1+G)} \cdot I_{IN} Z_T\right)$$

Also, $$V_0^+ - V_0^- = \Delta V_0$$

$$V_0^+ + V_0^- = 2 V_0(dc)$$

Then, $$V_0^- = V_0(dc) - \frac{\Delta V_0}{2} \quad (13)$$

Substituting equation (13) for $V_0^-$ in equation (12) yields $$\Delta V_0 = G\left(V_0(dc) - \frac{\Delta V_0}{2} + I_{IN} Z_T - V_0(dc) - \frac{G}{2(1+G)} \cdot I_{IN} Z_T\right)$$

$$= G\left(-\frac{\Delta V_0}{2} + \frac{I_{IN} Z_T}{2}\left(\frac{2+G}{1+G}\right)\right)$$

$$\Delta V_0 \left(1 + \frac{2}{G}\right) = I_{IN} Z_T \left(\frac{2+G}{1+G}\right)$$

$$\Delta V_0 = I_{IN} Z_T \left(\frac{G}{1+G}\right) \text{ with pulse present} \quad (14)$$

$$\approx I_{IN} Z_T \text{ for } G >> 1$$

(D) When current pulse goes away ($I_{IN}=0$), $V_{REF}$ does not change (in high-frequency case) because of peak detector. Therefore:

$$\Delta V_0 = G(V_0^- - V_{REF})$$

$$= G\left(V_0^- - V_0(dc) - \frac{G}{2(1+G)} \cdot I_{IN} Z_T\right)$$

$$= G\left(-\frac{\Delta V_0}{2} - \frac{G}{2(1+G)} \cdot I_{IN} Z_T\right)$$

$$\Delta V_0 = -I_{IN} Z_T \left(\frac{G^2}{(1+G)(2+G)}\right) \quad (15)$$

with pulse absent $$\approx -I_{IN} Z_T, \text{ for } G >> 1$$

For the high-frequency case, the difference in the output voltage when a data pulse is present ($I_{IN} \neq 0$) and when a data pulse is absent ($I_{IN}=0$) is $$\Delta(\Delta V_0) = I_{IN} Z_T \left( \frac{G}{1+G} \right) \left( 1 + \frac{G}{2+G} \right) \quad (16)$$

$$= I_{IN} Z_T \cdot \frac{2G}{2+G}$$

And the high-frequency differential transimpedance is, therefore, $$\frac{2G \cdot Z_T}{2+G} \approx 2Z_T, \text{ for } G >> 1 \quad (17)$$

Therefore, the ratio of high-frequency gain to low-frequency gain $$2\left( \frac{1+G}{2+G} \right) \approx 2 \quad (18)$$

for open loop gain "G" large ($>>2$).

Summarizing, the receiver 500 is described by the following characteristics:

I. With no current pulse present, i.e., at dc, intrinsic offsets are greatly reduced by open loop gain G of amplifier $A_1$ (equation 4).

II. At low frequency (extending to dc), or at the beginning of a data burst, the differential transimpedance (equation 7) equals $$Z_T \left( \frac{G}{1+G} \right) \approx Z_T$$

III. At high frequency, after the peak of the first data pulse of a data burst, differential transimpedance is (from equation 17) equal to $$Z_T \left( \frac{2G}{2+G} \right) \approx 2Z_T$$

IV. Receiver circuit 500 is self-adjusting so that during a data burst the following relationship exists:

$\Delta V_0$ (pulse present) $\approx -\Delta V_0$ (pulse absent) for $G>>1$.

As illustrated in FIG. 7, and described previously, this is the necessary condition for minimum pulse-width distortion (PWD), i.e., $(Q-\bar{Q})_{ZERO} = -(Q-\bar{Q})_{ONE}$.

SPECIFIC EMBODIMENT

Figure 12:
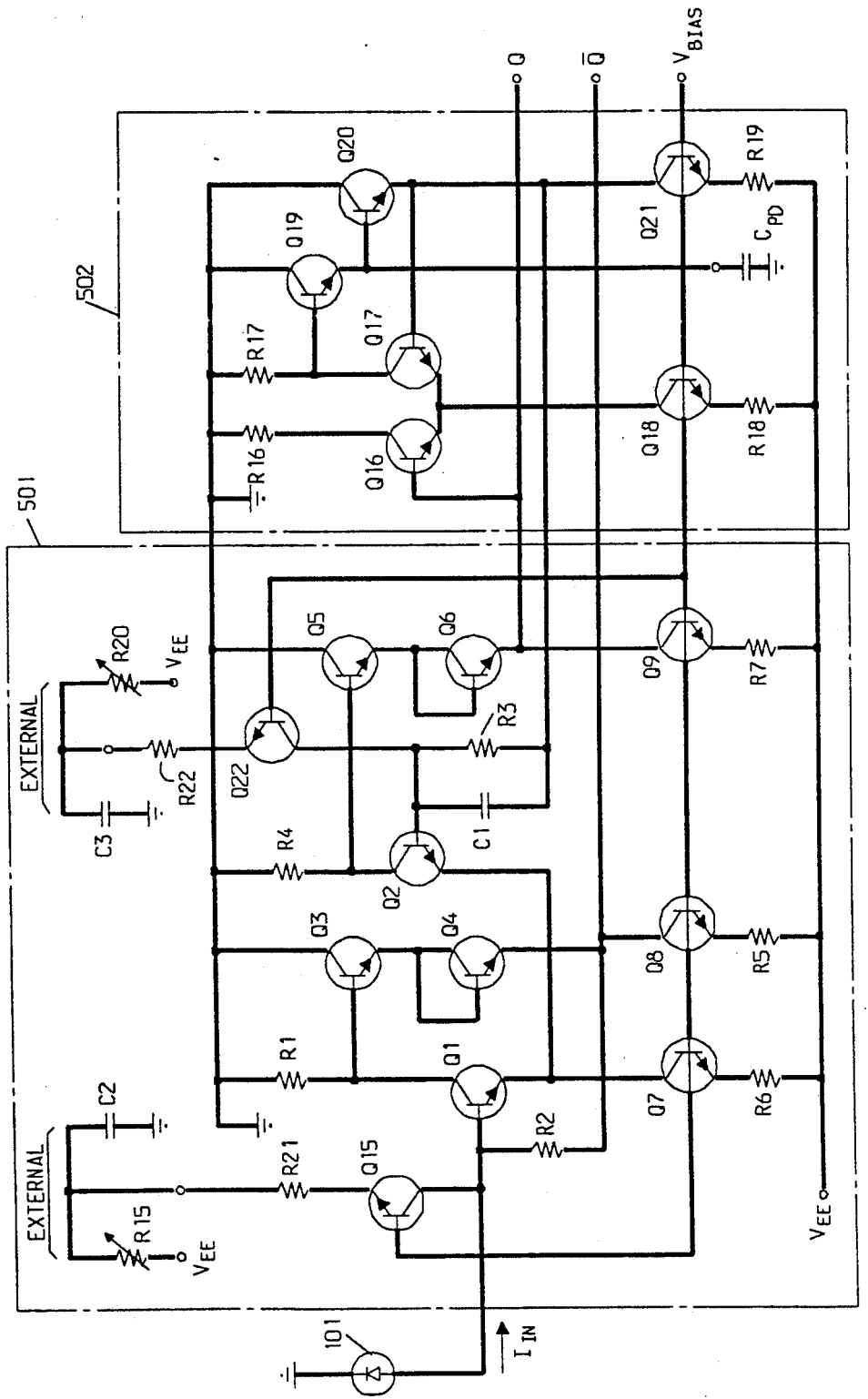
FIG. 12 shows a detailed specific embodiment of the present invention.

A detailed illustrative schematic diagram of the present invention is shown in FIG. 12. FIG. 12 will be discussed with joint reference to FIG. 11. The amplifier $A_1$ of FIG. 11 is composed of differential pair Q1–Q2; follower/level shifter stages Q3–Q4, Q5–Q12; and current sources Q7–Q9. The transimpedance resistors $Z_T$ and $Z_{T1}$ are R2 and R3, respectively. Resistors R5, R6 and R7 are bias current resistors and resistors R1 and R4 are gain-setting resistors. Q1, Q3, and Q4 together comprise a conventional single-ended transimpedance amplifier, and Q2, Q5, and Q6 comprise another single-ended transimpedance amplifier. Amplifier $A_1$ is comprised of two such single-ended amplifiers tied together at the emitters of Q1 and Q2 into a differential amplifier configuration.

The amplifier $A_2$ of peak detector 502 of FIG. 11 is the "twin" of amplifier $A_1$. Amplifier $A_2$ of FIG. 11 includes transistors Q16–Q21, and its bias current resistors (R18, R19) and gain-setting resistors (R16, R17) match those in $A_1$. The transistors $T_X$ and $T_Y$ of FIG. 5 are, respectively, transistors Q19 and Q20 of FIG. 12. The peak detector capacitor $C_{PD}$ serves two functions: It stores the sampled input pulse amplitude, as described earlier, and also establishes a "low-frequency" dominant node in the peak detector feedback loop, thus stabilizing the circuit. Note that the twin matching amplifier concept is modified by omitting the current source transistor at the emitter of Q19 (corresponding to Q8 or Q9 in $A_1$). While helping to prolong the discharge time of $C_{PD}$, it also introduces an offset in base-emitter voltage between Q19 and Q3 (or Q5). This corresponds to an input-referred offset current which the gain of amplifier $A_2$ reduces to a level required for the particular receiver. Shunt capacitor C1 located in parallel with R3 improves the transient response of receiver 500 by adding a zero to balance the pole at the base of Q2. Voltage $V_{BIAS}$ sets the transistor bias currents using resistors R5, R6, R7, R18 and R19.

Amplifiers $A_1$ and $A_2$ are each constructed of circuit implementations similar to emitter-coupled-logic (ECL) gates. The feedback combination of $A_1$ and $A_2$, therefore, is equivalent to a 2-gate delay circuit, with both the $A_1$ and $A_2$ amplifiers having comparable bandwidth. Moreover, such a feedback circuit is conveniently stabilized by a single dominant node capacitor ($C_{PD}$) at a bandwidth close to that of either amplifier alone. It is this configuration that allows setting $V_{REF}$ to the dc center of the logic pulse in a time substantially similar to the duration of a single logic pulse at the maximum data rate of amplifier $A_1$.

In an alternative implementation, the number of gain stages of amplifier $A_2$ may be increased. This has the beneficial effect of increasing the overall gain of $A_2$, thereby further reducing voltage offsets and peak detector capacitor charging time. Additional stabilization methods may then be required, however, to assure the stability of the combined transimpedance and $V_{REF}$ circuit feedback loop.

The low-frequency transfer function for the combination of differential amplifier 501 and peak detector 502 is given by $$\Delta V_0 = \frac{R1\, R2\, I_{IN}}{R1 + \frac{R2}{\beta} + 2 \frac{V_T}{I_0}}$$

and the "high-frequency" transfer function is given by $$\Delta V_0 = \frac{R1\, R2\, I_{IN}}{\frac{R1}{2} + \frac{R2}{\beta} + 2 \frac{V_T}{I_0}}$$

The gain, G, of amplifier $A_1$ is $$G \frac{R1}{\frac{R2}{\beta} + \frac{2V_T}{I_0}}$$

In these expressions $$V_T = \frac{kT}{q};$$

$I_0$ is the differential input stage (Q1, Q2) bias current; and R2 corresponds to the transimpedance $Z_T$ referred to previously. We have also required that R1=R4 and R2=R3. The term $\beta$ is the current gain of transistors Q1 and Q2. The low-frequency transfer function defines the amplitude-tracking characteristic of the peak detector, whereas the high-frequency transfer function indicates the net transimpedance when the peak detector is charged to $V_{REF}$, the half-amplitude reference voltage.

As described previously, with no data present, there must be a known offset at the amplifier outputs to assure that the decision circuit is in a well-defined logic ZERO state. This offset and component mismatch trimming are programmed by off-chip resistors R15 or R20, which inject offset currents directly via resistors R21 and R22, respectively, into the base of one side or the other of the input differential pair (i.e., Q1, Q2), depending on the polarity of the necessary voltage offset. Capacitors C2 and C3 are bypass capacitors. The differential logic ZERO offset voltage should be tuned to the minimum needed to guarantee a logic ZERO decision when there is no data present. This maximizes system sensitivity and minimizes PWD.

Since the peak detector charge (attack) and discharge (decay) characteristics are designed to minimize the probability of error in the first few bits of a data burst, the peak detector capacitor $C_{PD}$ charges as rapidly as possible. To maximize system sensitivity, the capacitor $C_{PD}$ maintains its charge for as long as possible once acquired. Charging time is determined by how much current transistor Q19 can source to $C_{PD}$, and this current, in turn, depends on the extent of the voltage swing on the base emitter junction of Q19. Thus, the larger the amplitude of the input current $I_{IN}$, the faster $C_{PD}$ will charge. $C_{PD}$ is discharged by the base current of Q20 at an appropriate linear rate. The charging time can be controlled by selecting $C_{PD}$ so that a data burst arrives and the peak detector reaches full charge during the first bit of the data burst.

While the disclosed embodiment of the present invention is implemented in a fully differential form using complementary bipolar integrated circuit (CBIC) linear array technology, it should be noted that other circuit technologies could be utilized, including integrated bipolar or FET.

The circuit can be implemented using, for example, silicon, gallium arsenide or other appropriate semiconductor materials. Moreover, it is contemplated that other well-known circuits can be used to implement the differential amplifier unit 501 or voltage reference circuit 502 shown in FIG. 6 without departing from the teaching of the present invention.

Additionally, while the present invention was described as a dc-receiver for use in a burst mode operated data system, it could be utilized in a system which utilizes continuous data transmissions. While the present invention has been described for use with optical signals, it should be understood that the present invention can be utilized in non-optical signals as well.

Finally, the present invention could be used with voltage input signals (rather than current input signals) by changing unit 501 from a transimpedance amplifier to a voltage amplifier. This is accomplished by replacing photodetector 101 with a voltage signal source of specified output impedance.

What has been described is merely illustrative of the application of the principles of the present invention. Other methods and circuits can be implemented by those skilled in the art without departing from the spirit and scope of the present invention.

We claim:

1. A digital data receiver comprising a DC-coupled differential amplifier circuit having a first input for receiving a digital data input signal, a second input for receiving a reference signal, and a data output;

means responsive to said data output for detecting a peak amplitude of said digital data input signal and for generating said reference signal in such a way that said amplifier circuit has a first gain value during the absence of said data input signal and while the data input signal is less than its peak amplitude, and has a second gain value approximately equal to twice the first gain value for a predetermined time after the peak amplitude of the data input signal is reached.

2. The receiver of claim 1 wherein said reference signal generating means is connected in a feedback loop between said data output and said second input of said amplifier circuit.

3. The receiver of claim 1 wherein said reference signal generating means includes a peak detector circuit for detecting said peak amplitude of said digital data input signal.

4. The receiver of claim 3 wherein said amplifier circuit and said reference signal generating means each include an amplifier means having operating characteristics which are substantially matched to each other.

5. The receiver of claim 4 wherein said amplifier circuit and said reference signal generating means are implemented as part of an integrated circuit.

6. The receiver of claim 3 wherein
   said amplifier circuit has a first feedback loop to regulate the magnitude of the input current to voltage output characteristic of said amplifier circuit and
   said reference signal generating means has a first feedback loop to control the gain of the peak detector circuit.

7. The receiver of claim 3 wherein said reference signal generating means includes
   means for storing the peak amplitude of said data input signal and
   an amplifier means for controlling the discharge rate of said means for storing.

8. The receiver of claim 7 wherein said means for storing is connected in said feedback loop and is connected in another feedback loop which controls the gain of said peak detector circuit.

9. The receiver of claim 1 wherein
   said feedback loop includes a parallel resistor and capacitor network connected in series to said second input of said amplifier circuit which cancels an impedance pole at the second input of said amplifier circuit.

10. The receiver of claim 1 wherein
    said amplifier circuit includes means for selecting a dc offset current between said first and said second inputs of the amplifier circuit.

11. The receiver of claim 1 wherein
    said reference signal generating means and said amplifier circuit operate at substantially the same maximum data rate, wherein said feedback loop is stable at the maximum data rate of said amplifier circuit and wherein the resulting voltage on said second input is substantially equal to the dc center of the input signal within a single bit period following the beginning of a received data burst.

12. A burst mode digital data receiver comprising a dc coupled differential amplifier circuit having a first input for receiving a burst mode digital data input signal, a second input connected to a voltage reference circuit, and a data output; and said voltage reference circuit being connected in a feedback loop between said data output and said second input for generating a reference DC voltage substantially equal to the dc center of the input signal within a single bit period following the beginning of a received burst mode digital data input signal; wherein said voltage reference circuit and said amplifier circuit have substantially the same maximum data transmission rate operating characteristics; and wherein said feedback loop is stable at the maximum data transmission rate of said amplifier circuit.

13. A burst mode digital data receiver comprising a DC-coupled differential input amplifier circuit having a first input for receiving a burst mode digital data input signal and a second input connected to a reference voltage circuit;

said reference voltage circuit being responsive to a detected peak amplitude of said digital data input signal and for generating a dc-voltage approximately equal to one-half of the amplitude of a received data input signal within a predetermined time of the beginning of the data input signal, and wherein said receiver has a first gain value during the absence of said data input signal and while the data input signal is less than its peak amplitude and has a second gain value approximately equal to twice the first gain value for a predetermined time after the peak amplitude of the data input signal is reached.

14. A digital data receiver comprising a DC-coupled differential amplifier circuit having a first input for receiving a digital data input signal, a second input connected to a voltage reference circuit, and a data output; and said voltage reference circuit being connected in a feedback loop between said data output and said second input for detecting a peak amplitude of said digital data input signal and generating a feedback signal to said amplifier circuit, resulting in said receiver having a first gain value during the absence of said data input signal and while the data input signal is less than its peak amplitude and having a second gain value approximately equal to two times the first gain value for a predetermined time after the peak amplitude of the data input signal is reached.

* * * * *